United States Patent
Wright et al.

(10) Patent No.: US 10,469,466 B2
(45) Date of Patent: Nov. 5, 2019

(54) SYSTEMS AND METHODS FOR VIRTUALIZATION IN DISTRIBUTED COMPUTING ENVIRONMENT INCLUDING A MOBILE MONITOR

(71) Applicant: Walmart Apollo, LLC, Bentonville, AR (US)

(72) Inventors: Cameron Lloyd Wright, Rogers, AR (US); Jason Rupert Roop, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 117 days.

(21) Appl. No.: 15/485,834

(22) Filed: Apr. 12, 2017

(65) Prior Publication Data
US 2017/0295148 A1    Oct. 12, 2017

Related U.S. Application Data

(60) Provisional application No. 62/321,463, filed on Apr. 12, 2016.

(51) Int. Cl.
*H04L 29/06* (2006.01)
*H04L 9/32* (2006.01)
(Continued)

(52) U.S. Cl.
CPC ........ *H04L 63/0471* (2013.01); *H04L 9/3268* (2013.01); *H04L 63/0823* (2013.01);
(Continued)

(58) Field of Classification Search
CPC ............. H04L 63/0471; H04L 63/0823; H04L 9/3268; H04L 63/166; H04L 67/10;
(Continued)

(56) References Cited

U.S. PATENT DOCUMENTS 7,873,540 B2    1/2011  Arumugam
8,261,320 B1    9/2012  Serenyi et al.
(Continued)

OTHER PUBLICATIONS

International Search Report and Written Opinion from related international patent application No. PCT/US2017/027222 dated Jul. 3, 2017.
(Continued)

*Primary Examiner* — Trong H Nguyen
*Assistant Examiner* — Amie C. Lin
(74) *Attorney, Agent, or Firm* — McCarter & English, LLP; David R. Burns

(57) ABSTRACT

Described in detail herein are systems and methods for a group of mobile devices including a stateless application virtualizing an instance of a stateful virtual application. In exemplary embodiments, a mobile monitor within a controller is configured to initialize a session between the stateless application of at least one of the mobile devices and the stateful virtual machine of the controller in response to a first request message from the at least one of the mobile devices. The mobile monitor is further configured to intercept a second request message from the at least one mobile device to the controller intended for the stateful virtual machine that includes encrypted data, transmit the encrypted data to a remote system for decrypting the encrypted data, receive the decrypted data from the remote system, and transmit the second request message and the decrypted data to the stateful virtual machine. The stateful virtual machine is configured to receive the second request message and the decrypted data and process the second request message using the decrypted data.

15 Claims, 6 Drawing Sheets

(51) Int. Cl.
*H04W 12/02* (2009.01)
*H04W 12/06* (2009.01)
*G06F 9/455* (2018.01)
*H04L 29/08* (2006.01)
*H04W 88/02* (2009.01)

(52) U.S. Cl.
CPC ........... H04L 63/166 (2013.01); H04W 12/02 (2013.01); H04W 12/06 (2013.01); *G06F 9/45533* (2013.01); *H04L 67/10* (2013.01); *H04L 67/142* (2013.01); *H04W 88/02* (2013.01)

(58) Field of Classification Search
CPC .... H04L 67/142; H04W 12/02; H04W 12/06; H04W 88/02; G06F 9/45533
See application file for complete search history.

(56) References Cited

U.S. PATENT DOCUMENTS

| | | | |
|---|---|---|---|
| 8,281,317 B1 | 10/2012 | Backensto et al. | |
| 8,356,754 B2 | 1/2013 | Johnson et al. | |
| 8,856,033 B2 | 10/2014 | Hicks et al. | |
| 8,869,235 B2 | 10/2014 | Qureshi et al. | |
| 8,892,945 B2 | 11/2014 | Benson et al. | |
| 2006/0167730 A1* | 7/2006 | Calderone | G06Q 10/06 709/246 |
| 2010/0057787 A1 | 3/2010 | Gnech et al. | |
| 2011/0082798 A1 | 4/2011 | Michaud et al. | |
| 2013/0151681 A1* | 6/2013 | Dournov | G06F 8/656 709/223 |
| 2014/0046786 A1 | 2/2014 | Mazaheri et al. | |
| 2014/0082350 A1 | 3/2014 | Zarfoss, III et al. | |
| 2014/0108172 A1 | 4/2014 | Weber et al. | |
| 2014/0249941 A1 | 9/2014 | Hicks et al. | |
| 2015/0081764 A1* | 3/2015 | Zhao | H04L 67/08 709/203 |
| 2015/0220745 A1* | 8/2015 | Nellitheertha | G06F 15/16 713/193 |
| 2015/0287031 A1 | 10/2015 | Radu et al. | |

OTHER PUBLICATIONS

Thales e-Security, Inc., mPOS: Secure Mobile Card Acceptance, 2013.

\* cited by examiner

United States Patent — US 10,469,466 B2

SYSTEMS AND METHODS FOR VIRTUALIZATION IN DISTRIBUTED COMPUTING ENVIRONMENT INCLUDING A MOBILE MONITOR

CROSS-REFERENCE TO RELATED PATENT APPLICATION

This application claims priority to U.S. Provisional Application No. 62/321,463 filed on Apr. 12, 2016, the content of which is hereby incorporated by reference in its entirety.

BACKGROUND

Protecting confidential and/or sensitive data being transmitted over communications networks has led to the implementation of various encryption schemes and techniques to encrypt data before transmitting the data over the communications networks. Encrypted data can cause issues when the receiving device attempts to process the data.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are systems and methods for virtualization in a distributed computing system. The distributed computing system including mobile devices and at least one controller disposed remotely with respect to the mobile devices. Each mobile device can include and execute a stateless application. The controller can include a mobile monitor, a dispatch engine and a stateful virtual machine. The controller is selectively and communicatively coupled to the mobile devices. The dispatch engine can be configured to provide an interface between the mobile devices, the mobile monitor, and the stateful virtual machine through which messages are queued and routed.

The mobile monitor can configured to initialize sessions between the stateless applications of the mobile devices and the stateful virtual machine (or instances thereof) of the controller in response to initialization request messages (e.g., a first request messages) from the mobile devices. The mobile monitor can intercept transaction request messages (e.g., second request messages) from the mobile devices intended for the stateful virtual machine that include encrypted data, transmit the encrypted data to a remote system for decrypting the encrypted data, receive the decrypted data from the remote system, and transmit the transaction request messages and the decrypted data to the stateful virtual machine. The mobile devices can encrypt the data in hardware and can embed the encrypted data in the transaction requests before transmitting the transaction requests to the stateful virtual machine. The stateful virtual machine can be configured to receive the transaction request messages and the decrypted data and process the transaction request message using the decrypted data.

In exemplary embodiments, the remote system can be a Hardware Security Module (HSM) web-server. The mobile monitor transmits a signed certificate with the encrypted data to the HSM web-server for authentication.

Exemplary embodiments of the present disclosure can include a module element within the stateless application configured to transform messages from the mobile devices into a first format that is compatible with the controller and to transform messages from the controller that into a second format that is compatible with the mobile devices.

The mobile monitor is configured to generate a group of threads. The group threads generate the mobile monitor are associated with at least one of: data decryption or session association.

The system further including a central database, wherein the stateful virtual machine updates the central database upon the processing of the transaction request messages to maintain the accuracy of the data in the central database based on data received from the mobile devices.

Figure 1A:
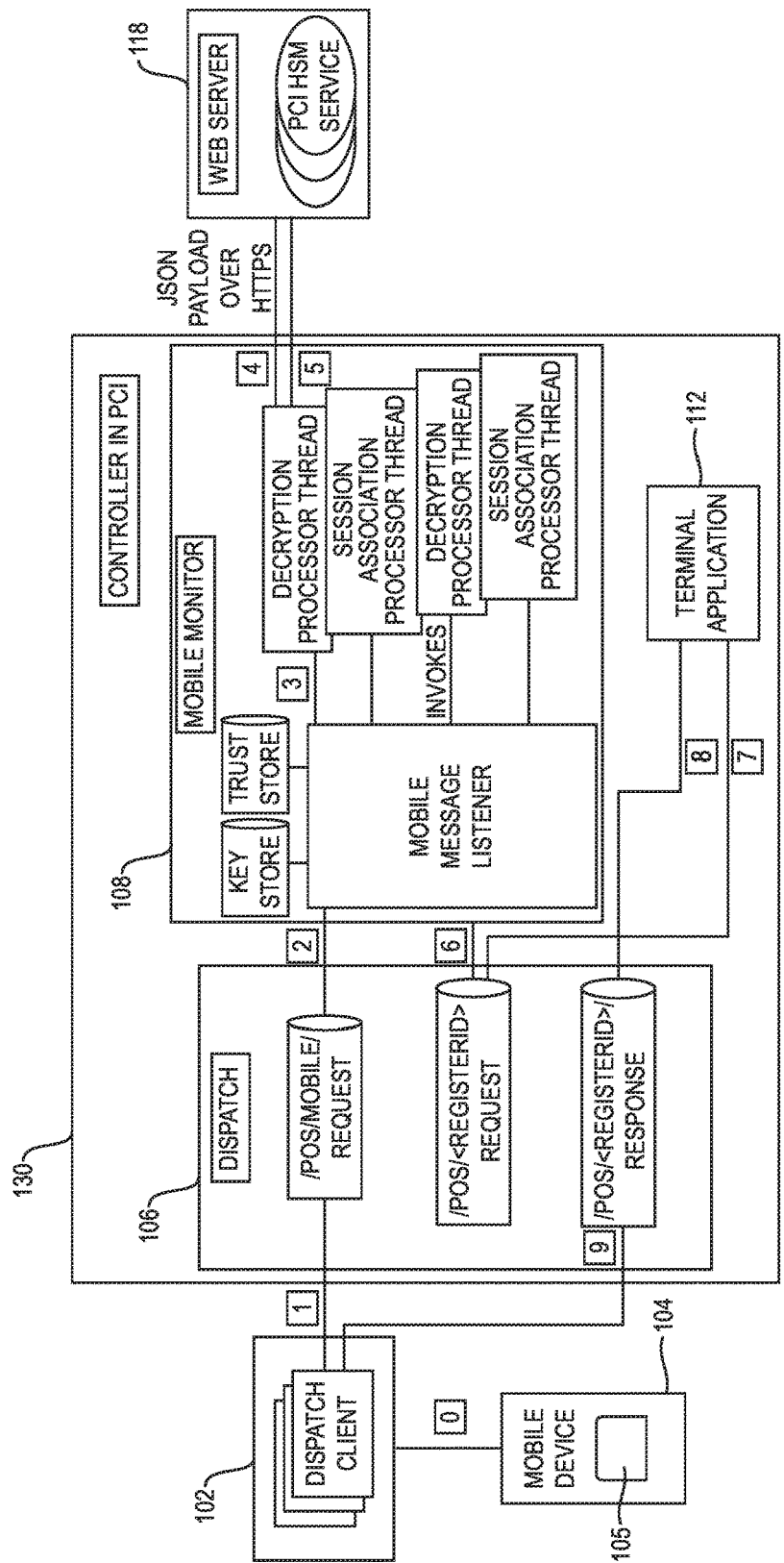
FIGS. 1A-B are block diagrams illustrating a distributed virtualized environment including a mobile monitor according to exemplary embodiments.
Figure 1B:
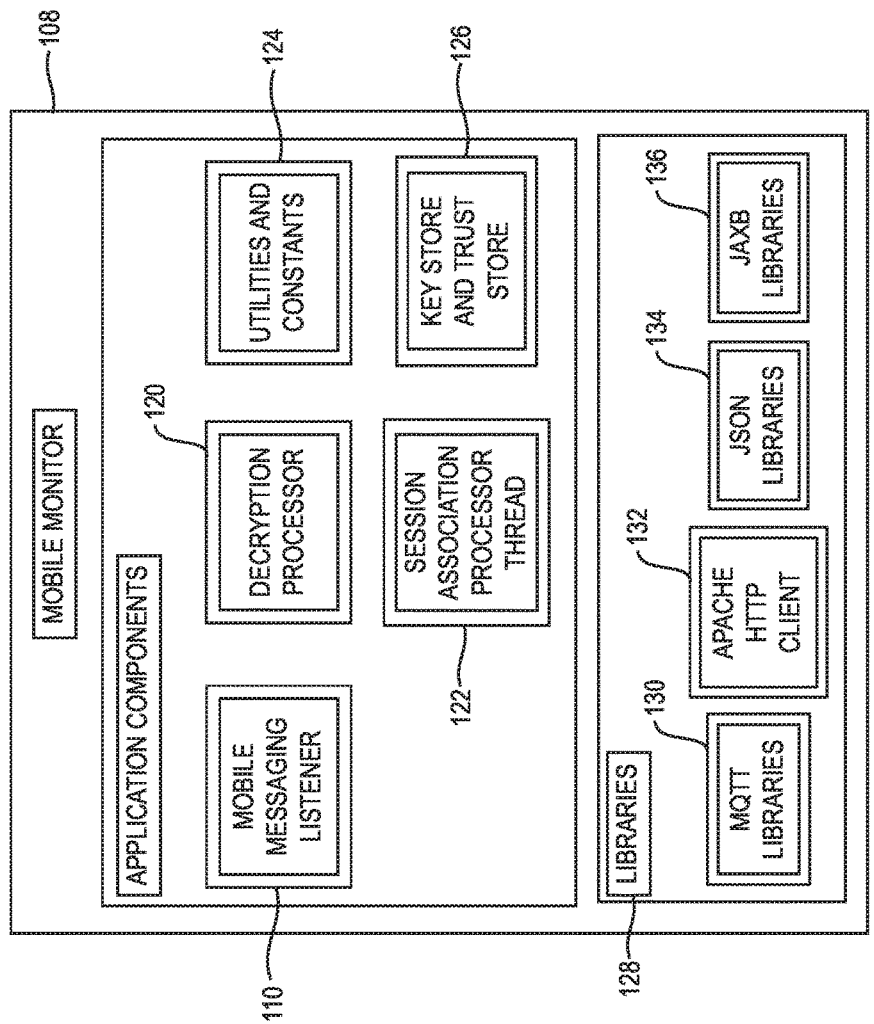

FIGS. 1A-B are block diagrams illustrating a distributed computing environment including a mobile monitor according to exemplary embodiments. With reference to FIGS. 1A-1B as non-limiting example of embodiments of the present disclosure, the environment 100 includes one or more mobile devices (e.g., a mobile device 104) including and executing a stateless application 105; a dispatch client 102; and a controller 130 that is communicatively coupled to the dispatch client 102 and mobile device 104.

The dispatch client 102 can be a standalone device such as a gateway or router and/or can be incorporated into a server. The dispatch client 102 can be configured to relay messages to and from the controller 130 and the mobile device 104 to provide an interface between the mobile device 104 and the controller 130. The dispatch client 102 can provide an extra layer of security by keeping the mobile device 104 out of the scope of portions of the system that are trusted from handling and decrypting confidential and/or sensitive information. The dispatch client 102 can receive messages from the mobile devices and forward the messages to the controller 130. Likewise, the dispatch client 102 can receive messages from the controller 130 forward the messages to the mobile devices.

The controller 130 can be a distributed computing cluster made up of multiple servers. The controller 130 can include a mobile monitor 110, a dispatch engine 106 and a stateful virtual machine 112. Each component may reside on one or more separate servers. The controller 130 can be structured and configured to provide services typically associated with separated decentralized dedicated front-end hardware devices. This virtualization of the dedicated hardware solutions provides a centralized structure in which the controller supports the operation of distributed front-end hardware devices. This can advantageously result in the reduction of distributed front-end physical computing resources, while providing increased flexibility with respect to modifying, testing, and the services provided by the controller 130 and consumed by the front-end hardware devices.

The dispatch engine 106 can be a server application including multiple sets of queues for various topics (e.g., message types and/or content). The messages being transmitted through the dispatch client 102 or other components of the controller 130 can be pushed into the queues based the topic of communication (e.g., message types and/or content) and the communicating device or component. For example, the dispatch engine 106 can provide an interface through which messages are queued and routed between the mobile device 104, the mobile monitor 108, and/or the stateful virtual machine 112. Each queue in the dispatch engine 106 can be located in separate physical and logical storage location and can be stored in separate database. Conversely, a common physical and logical memory block can be assigned to the queues and/or each queue can be located in a single database.

The mobile monitor 108 can be an application located on one or more servers. As shown in FIG. 1B, the mobile monitor 108 can include applications/services including, a mobile message listener 110, a decryption processor thread 120, a session association processor thread 122, utilities and constants 124, and key store and trust store 126. The mobile monitor 108 can include libraries 128 including MQTT Libraries 130, Apache HTTP Client 132, JSON Libraries and the JAXB Libraries 134. The libraries can facilitate the various application components functionalities and can be called and/or invoked by the mobile message listener 110, the decryption processor thread 120, the session association processor thread 122, the utilities and constants 124, and/or the key store and trust store 126. The mobile monitor 108, via the mobile message listener 110, may subscribe to the queues in the in the dispatch engine 106 to intercept specific messages from the mobile device 104 that are intended for the stateful virtual machine 112. Upon intercepting the messages, the mobile message listener 110 can push the message into a thread such as the decryption processor thread 120 or the session association processor thread 122. The decryption processor thread 120 and the session association processor thread 122 can include software processes such as Java-based processes. The key store and trust store 126 can be located in one or more databases and can store security certificates received by and/or used by the decryption processor thread 120 when performing decryption processes associated with encrypted data.

In a non-limiting example, a decryption request message can be embodied as:

```
<M1>
   <M2>1</M2>
   <M3>CommandResponse</M3>
   <M4>Message</M4>
   <M6>0</M6>
   <M7>DecryptCardInfo</M7>
   <M8>0</M8>
   <M9>
      <A1>
         <A2>
            <O>1</O>
            <R>24</R>
            <E>true</E>
            <C>
               <D>Issuer</D>
               <>USD</CR>
               <V>false</V>
               <AM>100</AM>
               <CI>1</CI>
               <S>
                  <SR/>
<SR2>XXXXXXXXXXXXXXXXXXXXXXXXXXXXXX</SR2>
                  <SR/>
               </S>
            </C>
         </A2>
      </A1>
   </M9>
</M1>
```

The Mobile message listener 110 will read the command "DI" (<Command>DI</Command>) from the message and accordingly invokes Card Decryption Processor thread.

The decryption processor 120 can receive a request and construct "decryption request" as shown below and sends the request message to the HSM web-server 118. As a non-limiting example, the request can be embodied as:

```
{ "divID": "XX", "keyID": "XXXXXXXX", "cipher":
   "rXXXXXXXXXXXXXXXXXXXXXXXXXXXXXXXX" }
```

As a non-limiting example, the response received from the HSM web-server 118 can be embodied as:
<DR>
   <r>XXXXXXXXXXXXXXXXXXXXXXXXXXXPw=
   </r> <S>OK</S> </DR>

After decrypting the card information, a new request is constructed and put into <rId>/requests topic, which will be further processed by TSA.

The mobile monitor 108 can communicate with a remote system 118 external to the controller 130, such as a Hardware Security Module (HSM) web-server. The HSM web-server 118 can receive encrypted data from the decryption processor thread 120 for decryption. The HSM web-server 118 is implemented with mutually authenticated Transport Layer Security (TLS) which requires a received signed certificate from the Key Store and Trust Store 126. The TLS protocol ensures privacy between communicating applications and their users on the Internet.

In an example operation, the mobile device 104 can transmit an initialization request message to the controller 130, via the dispatch client 102. The stateless application 105 can include a modular element to convert the messages into a specific format for the controller 130 before transmitting the message to the dispatch client. In one embodiment, the modular element can encapsulate the initialization request message in Extensible Mark-up Language (XML) tags before transmitting the initialization request message to the dispatch client 102. For example, the modular element can reformat the initialization request message and its content into a form that is compatible with the controller 130 so that the controller 130 can read and process the initialization request message. The dispatch client 102 can transmit the initialization request message to the dispatch engine 106 of the controller 130. The dispatch engine 104 can place the request in the queue for initialization requests. In some embodiments, the initialization request message transmitted from the mobile device 104 to the controller 120 can be intended for consumption by the stateful virtual machine 112 and can include a request to associate the mobile device 104 with an instance of the stateful virtual machine 112.

The mobile listener 110 of the mobile monitor 108 can subscribe to the queue for initialization request messages in the dispatch engine 106 so that the mobile monitor 108 can intercept initialization request messages. Upon intercepting the initialization request message, the mobile listener 110 can push the initialization request message into the session association thread 122, which can initialize and establish a session between the stateless application 105 being executed by the mobile device 104 and the stateful virtual machine 112 of the controller 130. The session association thread 122 can maintain an association between the mobile monitor 108 and the instance of the stateful virtual machine 112.

After initialization, the mobile device 104 can interact with a virtual session of the stateful virtual machine 112. The mobile device 104 can transmit messages to the stateful virtual machine 112 that include data and/or instructions/commands and the stateful virtual machine can perform operations using physical resources allocated to the virtual session based on the data and/or instructions/commands received in the messages. The messages transmitted by the mobile device 104 be received by the dispatch client 102, which can transmit the messages to the dispatch engine 106. The dispatch engine 106 can place the messages in a queue associated with messages from mobile devices that have been initialized and associated with an instance of the stateful virtual machine 112. The dispatch engine 106 can place the messages in a queue such as, a request queue, which can queue messages intended for consumption by the stateful virtual machine 112. At least some of the messages transmitted by mobile devices can include encrypted data. For example, the mobile devices can encrypt sensitive and/or confidential data at the hardware-level and can incorporate the encrypted data into the messages. In exemplary embodiments, the dispatch client 102 serves as a bridge between trusted components of the system (e.g., components for processing and decrypting confidential and/or sensitive data, such as the controller 130) and components that are untrusted or more vulnerable to data breaches (e.g., the mobile device 104). Using this security measure, the controller 130 cannot receive the messages with encrypted data directly from the mobile device 104. Rather, the mobile device 104 must send the message with encrypted data to the dispatch client 102. The dispatch client 102 can recognize certain authorized messages received from the mobile device as being safe for forwarding to the controller 130 to add a layer of security that keeps the mobile device 104 out of the encrypted/decrypted data scope.

The mobile listener 110 can subscribe to the request queue in the dispatch engine 106 to listen for any messages including encrypted data based on the content and instructions/commands within the message and can intercept the messages including encrypted data before the dispatch engine forwards the messages to their intended destination, i.e., the stateful virtual machine 112. The mobile monitor 108 can place the messages including encrypted data in the decryption processor thread 120, which can transmit the encrypted data with a security signed certificate from the key and trust store 126 to the to the remote system 118 for decrypting the encrypted data. As discussed above, the remote system can be a HSM web-server. The HSM web-server can be implemented with mutually authenticated TLS which requires the received signed certificate. The HSM web-server decrypts the encrypted data and transmits the decrypted data to the mobile monitor 108. The mobile monitor 108 can receive the decrypted data from the HSM web-server and place the message including the decrypted data in a queue in the dispatch engine 106, such as the request queue. The registerID can be associated with a session ID indicating the instance of the stateful virtual application 112 being utilized by a mobile device. The dispatch engine 106 can transmit the request message including decrypted data to the stateful virtual machine 112.

The stateful virtual machine 112 can receive the messages including the decrypted data and can process the messages using the decrypted data to perform one or more operations for the mobile devices using physical and/or logical resources assigned to the respective sessions associated with the mobile devices. The stateful virtual machine 112 can transmit responses to the processed messages to the mobile devices (e.g., a response to the mobile device 104) via the dispatch client 106.

As non-limiting example of embodiments of the present disclosure, the virtualization environment 100 may be embodied as a mobile device 104 virtualizing a POS system of a retail store. For example, the mobile device 104 can be an MC 40 handheld device and/or other portable, wireless devices such as smart phones and/or tablets. The mobile device can include the stateless application 105 and the stateful virtual machine 112 can be a virtualization of a terminal sales application of a POS terminal. The mobile device can be a device used by retail store employees to process transactions stateful virtual machine 112. The stateless application 105 can include a modular element. The modular element can convert the register initialization request message to a format specific to the controller 130 before sending the register initialization request message to the dispatch client 102. The mobile device 104 can transmit a register initialization request message to the dispatch client 102, which can forward the register initialization request message to the controller 130. The register initialization request message may include a request to associate the mobile device 104 with an instance of the terminal sales application 112 and assign the mobile device 104 a register number The dispatch engine 104 can place the request in the queue for initialization requests.

The mobile monitor 108 can intercept the register initialization request message from the queue for initialization requests in the dispatch engine 106. The mobile monitor 108 can initialize a session between the mobile device 104 and the stateful virtual machine 112 of the controller 130 by placing the request for initialization in the session association thread 122. The session association thread 122 may associate the mobile device 104 with a session of the stateful virtual machine. The session association thread 122 may assign a register number to the mobile device 104 from a set of available register numbers. The stateful virtual machine 112 can have access to a retail's store central database.

After initialization, the mobile device 104 can execute a virtual session of the stateful virtual machine 112 to implement operation of a POS system. The mobile device 104 may have access the retail's stores central database via the stateful virtual machine 112. Consequently, the mobile device 104 can have access to merchandise and/or inventory information associated with the retail store within which the mobile device is being operated. Furthermore, the mobile device 104 can process a transaction for merchandise being purchased. For example, the mobile device 104 can process a payment for merchandise by transmitting a tender request to the virtual machine 112 including encrypted payment card data. The mobile device 104 can encrypt the payment card data at the hardware-level and can transmit the tender request to the controller 130 via the dispatch client 102. The dispatch client 102 can keep the mobile device 104 out of Payment Card Information (PCI) scope by forwarding the tender request to the controller 130. Upon receipt of the tender request by the controller 130, the tender request including encrypted payment card data can be placed in a queue for requests from mobile devices that are initialized and associated with the virtual machine 112.

The mobile monitor 108 can intercept the tender request message including encrypted payment card data and can place the tender request message including encrypted payment card data in the decryption processor thread 120 (as shown in FIG. 1B). The decryption processor thread 120 can extract the encrypted payment card data from the tender request and can construct a web service request that includes the encrypted payment card data. The decryption processor thread 120 can transmit the encrypted payment card data to a remote system 118 in the web service request and the remote system 118 can decrypt the encrypted payment card data. The remote system can be a Hardware Security Module (HSM) web-server. The remote system 118 transmits the decrypted payment card data to the mobile monitor 108, and the mobile monitor 108 places the tender request message including the decrypted payment card data in a queue in the dispatch engine 106. The dispatch engine 106 can transmit the request message including decrypted data to the stateful virtual machine 112.

The stateful virtual machine 112 can receive the tender request message including the decrypted payment card data and process the tender request message using the decrypted payment card data. The stateful virtual machine 112 can transmit a response of the completed payment transaction to the mobile device 104 via the dispatch client 106. In some embodiments, the virtualization environment 100 can include a central database of the retail store. The central database may include the merchandise information of the merchandise sold at the retail store. The merchandise information may include pricing and inventory information. After the completion of the payment, the stateful virtual machine can update the pricing and inventory information in the central database.

In some embodiments, the mobile device 104 can include, for example, wireless devices, portable devices, wearable computers, cellular or mobile phones, portable digital assistants (PDAs), smart phones, tablets, ultrabooks, netbooks, laptops, multi-processor systems, microprocessor-based or programmable consumer electronics, mini-computers, and the like.

Figure 2A:
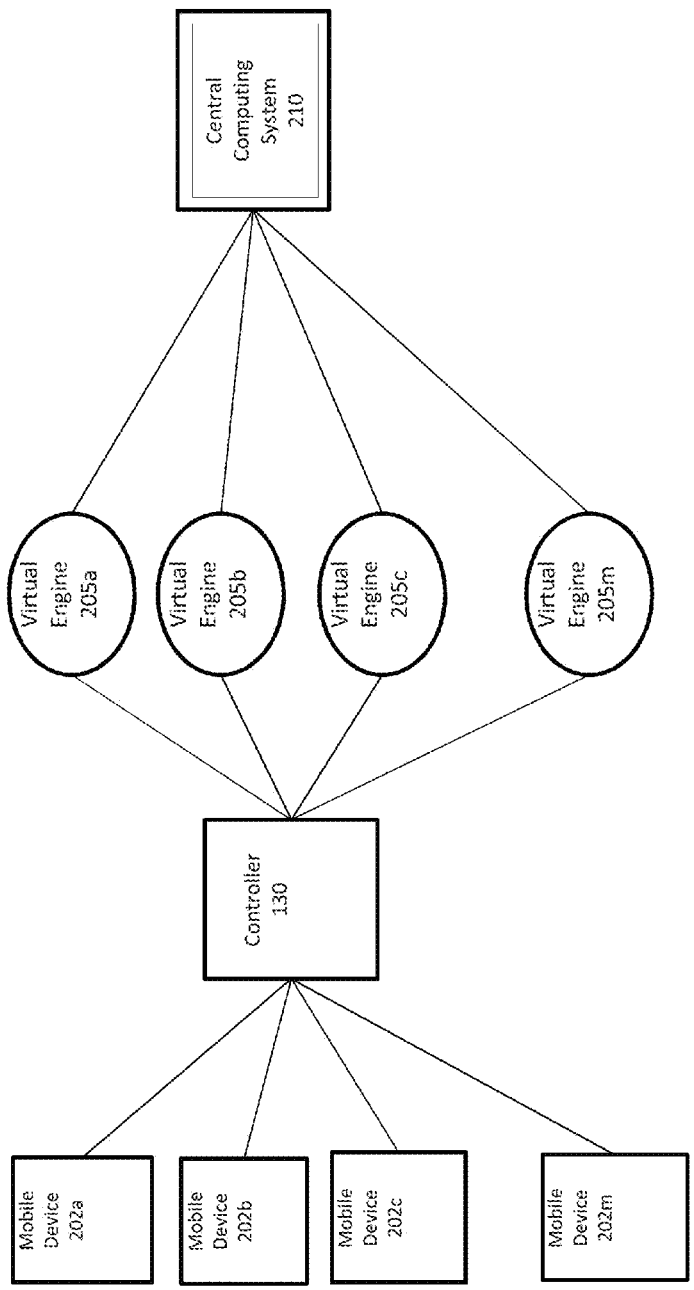
FIGS. 2A-B illustrate an exemplary network environment for virtualization in a distributed computing system in accordance with exemplary embodiments of the present disclosure.
Figure 2B:
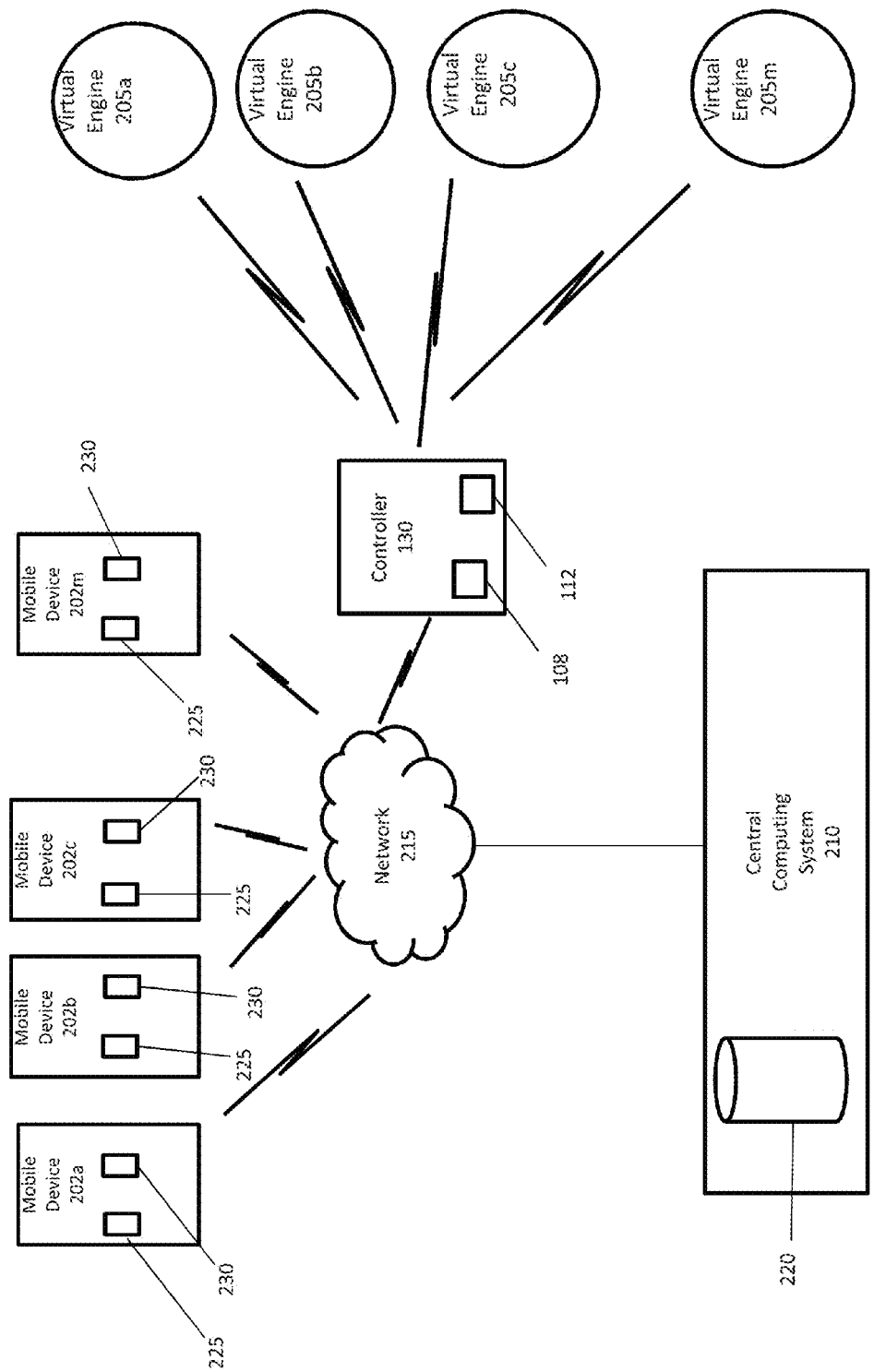

FIGS. 2A-B illustrate an exemplary network environment 200 in accordance with exemplary embodiments of the present disclosure. Turning to FIG. 2A, in exemplary embodiments, the network environment 200 can include mobile devices 202a-m, a controller 130, virtualization engines 202a-m and a central computing system 210. Each virtualization engine 205a-m is an instance of the stateful virtual application 112. Each mobile device may be associated with one of the virtualization engines 205a-m, via the controller 130. The instances of the virtual machine can look, feel and provide full functionality of dedicated hardware device having a specific structure and function. For example, the mobile device 202a can be associated with virtualization engine 202c and the virtualization engine 202c can be a virtualization of a POS terminal. The virtualization engine 202c may be communicatively coupled to the central computing system 210. Each virtualization engine can be exclusive of the other virtualization engines.

Turning to FIG. 2B, the mobile devices 202a-m, the controller 130, the virtualization engines 205a-m and the central computing system 210 can communicate via a network 215. The central computing system 210 can include a database 220. The mobile devices 202a-m can include a processor 230 and a display 225. Each virtualization engine can be an instance of a stateful virtual application 112 (FIG. 1).

In an example embodiment, one or more portions of network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In exemplary embodiments, a mobile device 202a can transmit an initialization request message to the controller 130. The controller 130 may receive the initialization request message and the mobile monitor 108 (as shown in FIGS. 1A-1B). The mobile monitor 108 can initialize the mobile device 202a by associating the mobile device 202a with a virtualization engine 205c, an instance of the stateful virtual application 112 (as shown in FIG. 1A)

After initialization, the virtualization machine 205c of the mobile device 202a can transmit a request message including encrypted data to stateful virtual application, via the controller 130. The mobile monitor 108 within the controller 130 may intercept the request message including the encrypted data. The mobile monitor 108 may transmit the encrypted data to a remote system for decryption. The remote system may decrypt the encrypted data and transmit the decrypted data to the mobile monitor 108. The controller 130 can transmit the request and decrypted data to the stateful virtual application. The stateful virtual application can process the request using the decrypted data and transmit a response of the processed data to the virtualization machine 205c of the mobile device 202a. In response to processing the request, the mobile device 202a can also update the central database 220, via the virtualization machine 205c.

Figure 3:
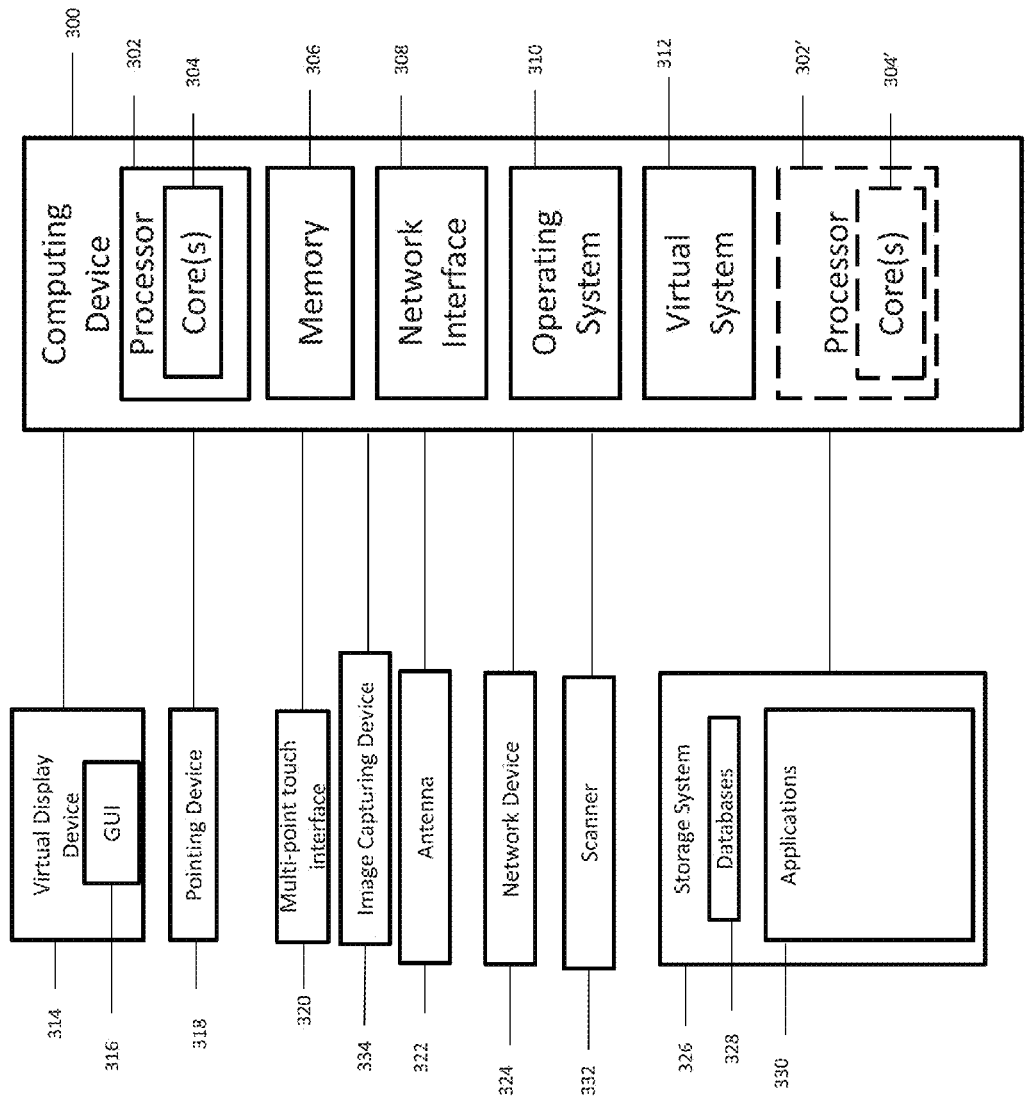
FIG. 3 is a block diagram of an example computing system for implementing exemplary embodiments of the present disclosure.

FIG. 3 is a block diagram of an example computing device for implementing exemplary embodiments of the present disclosure. In exemplary embodiments, the computing device 300 can implement embodiments of central computing system 210, the controller 130, the POS systems 205a-m and/or the mobile devices 202a-m. The computing device 300 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives, one or more solid state disks), and the like. For example, memory 436 included in the computing device 300 can store computer-readable and computer-executable instructions or software (e.g., embodiments of the stateless application 105 when the computing device is implemented as a mobile device or stateful virtual machine 112 when the computing device forms part of the controller 130) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' can each be a single core processor or multiple core (304 and 304') processor. Either or both of processor 302 and processor(s) 302' can be configured to execute one or more of the instructions described in connection with central computing system 310.

Memory 306 can include a computer system memory or random access memory, such as DRAM, SRAM, EDO RAM, and the like. Memory 306 can include other types of memory as well, or combinations thereof.

A user can interact with the computing device 300 through a visual display device 314, such as a computer monitor, which can display one or more graphical user interfaces 316, multi touch interface 320, an image capturing device 334, a scanner 332 and a pointing device 318. The scanner 332 can be a barcode reader or RFID reader configured to read optical machine readable representations such as barcodes, QR codes and RFID tags.

The computing device 300 can also include one or more storage devices 326, such as a hard-drive, CD-ROM, or other computer readable media, for storing data and computer-readable instructions and/or software that implement exemplary embodiments of the present disclosure (e.g., embodiments of the stateless application 105 when the computing device is implemented as a mobile device or stateful virtual machine 112 when the computing device forms part of the controller 130). For example, exemplary storage device 326 can include one or more databases 328 for storing information regarding the physical objects. The databases 328 can be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 can include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 can run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 can be run in native mode or emulated mode. In an exemplary embodiment, the operating system 310 can be run on one or more cloud machine instances.

Figure 4:
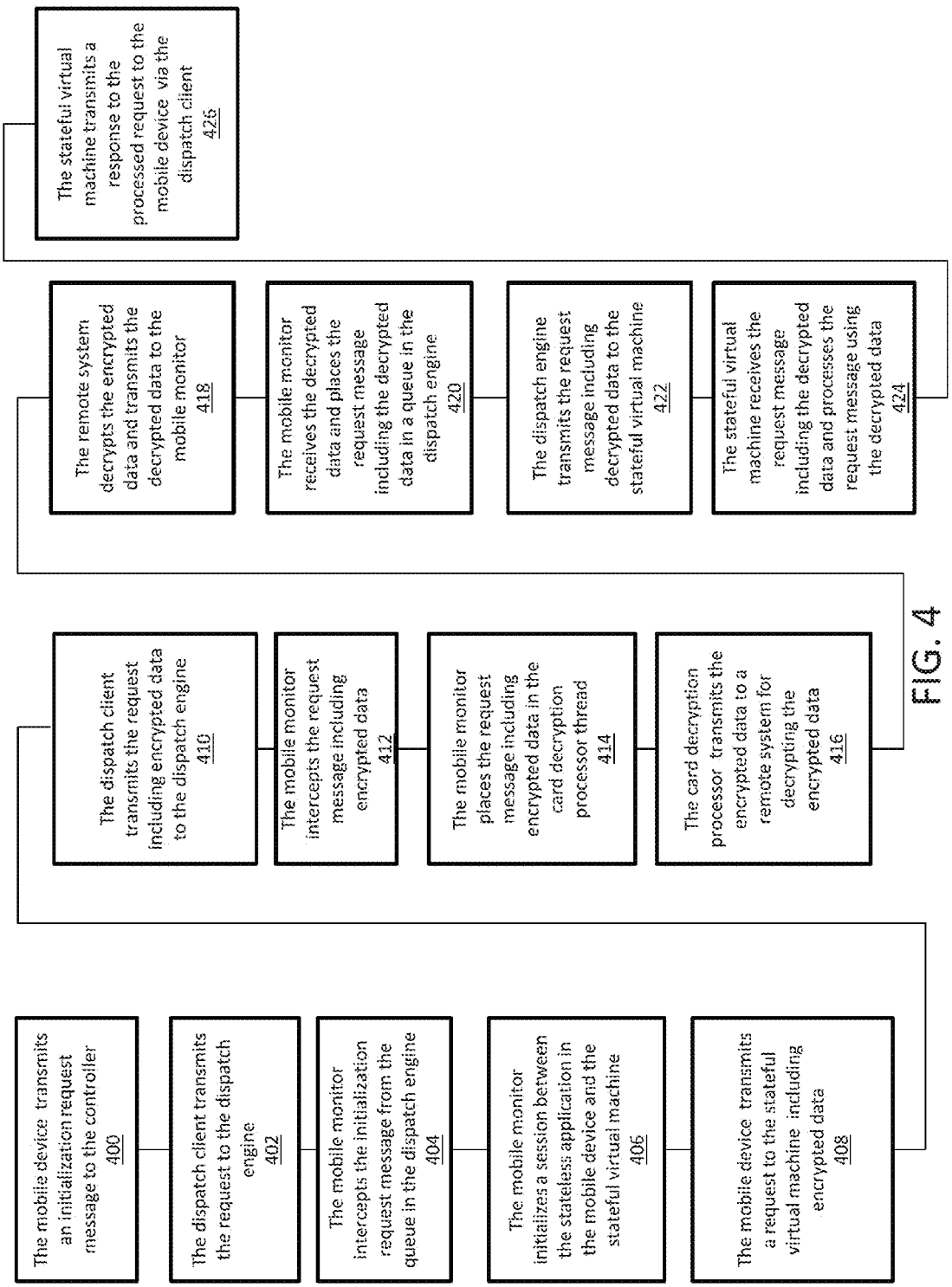
FIG. 4 is a flowchart illustrating an exemplary process for virtualization in accordance with exemplary embodiments of the present disclosure.

FIG. 4 is a flowchart illustrating an exemplary process virtualization according to exemplary embodiments.

In operation 400, a mobile device (e.g., the mobile device 104) can transmit an initialization request message to a controller (e.g., the controller 130), via a dispatch client (e.g., the dispatch client 102). The request transmitted by the mobile device can be intended for a stateful virtual machine (e.g., stateful virtual machine 112) provided by the controller. The initialization request may include a request to associate the mobile device with an instance of the stateful virtual machine. The mobile device can include a stateless application 105 (as shown in FIG. 1) including a modular element. The modular element can reformat the request for the controller so that the controller can read the request. In operation 402, the dispatch client can transmit the request to a dispatch engine of the controller, which can place the request in the queue for initialization requests.

In operation 404, a mobile monitor of the controller can intercept the initialization request message from the queue in the dispatch engine. In operation 406, the mobile monitor can initialize a session between a stateless application in the mobile device and the stateful virtual machine of the controller by placing the request for initialization in the session association thread (as shown in FIG. 1B 122). The session association thread may associate the mobile monitor with an instance of the stateful virtual machine.

In operation 408, after initialization, the mobile device can transmit a request to the stateful virtual machine including encrypted data via the dispatch client. In operation 410, the dispatch client can transmit the request including encrypted data to the dispatch engine and the dispatch engine can place the request including encrypted data in a queue for requests from mobile devices that have been initialized and associated with an instance of the stateful virtual machine.

In operation 412, the mobile monitor can intercept the request message including encrypted data. The mobile monitor intercepts the request message including encrypted data when the mobile messaging listener (as shown in FIGS. 1A-B 110) detects the request message includes encrypted data. In operation 414, the mobile monitor can place the request message including encrypted data in a decryption processor thread (e.g., decryption processor thread 120). In operation 416, the decryption processor can transmit the encrypted data to a remote system (as shown in FIG. 1A) for decrypting the encrypted data. The remote system can be a Hardware Security Module (HSM) web-server. In operation 418, the HSM web-server decrypts the encrypted data and transmits the decrypted data to the mobile monitor.

In operation 420, the mobile monitor can receive the decrypted data from the HSM web-server and place the request message including the decrypted data in a queue in the dispatch engine. In operation 422, the dispatch engine can transmit the request message including decrypted data to the stateful virtual machine.

In operation 424, the stateful virtual machine can receive the request message including the decrypted data and process the request message using the decrypted data. In operation 426, the stateful virtual machine can transmit a response to the processed request to the mobile device via the dispatch client. In some embodiments, in response to processing the request, the mobile device 104 can update the central database (as shown in FIG. 2).

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

We claim:

1. A distributed computing system comprising:
   a plurality of mobile devices, each mobile device of the plurality of mobile devices including a stateless application; and
   a controller including a mobile monitor, a dispatch engine and a stateful virtual machine, the controller being communicatively coupled to the plurality of mobile devices, wherein:

the dispatch engine is configured to provide an interface between the plurality of mobile devices, the mobile monitor, and the stateful virtual machine through which messages are queued and routed, the mobile monitor includes a mobile listener and is configured to initialize a session between the stateless application of at least one of the plurality of mobile devices and the stateful virtual machine of the controller in response to a first request message from the at least one of the plurality of mobile devices, intercept a second request message from the at least one of the plurality of mobile devices to the controller intended for the stateful virtual machine that includes encrypted data in response to the mobile listener detecting the encrypted data in the second request message, transmit the encrypted data to a remote system for decrypting the encrypted data, receive the decrypted data from the remote system, and transmit the second request message and the decrypted data to the stateful virtual machine, and the stateful virtual machine is configured to receive the second request message that was intercepted by the mobile monitor prior to the stateful virtual machine receiving the second request message and the decrypted data and process the second request message using the decrypted data.

2. The system in claim 1, wherein the mobile monitor transmits a signed certificate with the encrypted data to a remote device, wherein the remote system is a Hardware Security Module (HSM) web-server.

3. The system in claim 1, wherein the stateless application further comprising, a modular element configured to transform messages from the mobile devices of the plurality of mobile devices into a first format that is compatible with the controller and to transform messages from the controller into a second format that is compatible with the mobile devices of the plurality of mobile devices.

4. The system in claim 1, wherein the mobile monitor is configured to generate a plurality of threads.

5. The system in claim 4, wherein the plurality of threads generated by the mobile monitor are associated with at least one of: data decryption or session association.

6. The system in claim 1, wherein the at least one of the plurality of mobile devices generates the encrypted data to be embedded in the second request message and embeds the encrypted data in the second request message before transmitting the second request to the stateful virtual machine.

7. The system in claim 1, further comprising a central database, wherein the stateful virtual machine updates the central database upon the processing of the second request message.

8. A method implemented by a distributed computing system, the method comprising:
initializing, via a mobile monitor of a controller, a session between a stateless application of a mobile device and a stateful virtual machine of the controller in response to a first request message from the mobile device, the mobile device and the mobile monitor communicating via an interface provided by a dispatch engine of the controller;

intercepting, via the mobile monitor within the controller, the mobile monitor including a mobile listener, a second request message from the mobile device to the controller that is intended for the stateful virtual machine, the second request message including the encrypted data, in response to the mobile listener detecting encrypted data in the second request message;

transmitting, via the mobile monitor, the encrypted data to a remote system for decrypting the encrypted data;

receiving the decrypted data from the remote system by the mobile monitor;

transmitting the second request message and the decrypted data to the stateful virtual machine by the mobile monitor;

receiving, via the stateful virtual machine the second request message that was intercepted by the mobile monitor prior to the stateful virtual machine receiving the second request message and the decrypted data;

processing, via the stateful virtual machine, the second request message using the decrypted data; and transmitting a response message from the stateful virtual machine to the mobile device via the dispatch engine, the response message being generated based on an analysis of the decrypted data by the stateful virtual machine.

9. The method in claim 8, further comprising:
transmitting, via the mobile monitor, a signed certificate along with the encrypted data to a remote device for authentication wherein the remote system is a Hardware Security Module (HSM) web-server.

10. The method in claim 8, wherein the stateless application includes a modular element.

11. The method of claim 10, further comprising:
transforming, via the modular element, messages from the mobile device into a first format that is compatible with the controller and transforming messages from the controller into a second format that is compatible with the mobile device.

12. The method in claim 8, further comprising:
generating, by the mobile monitor, a plurality of threads.

13. The method in claim 12, wherein the plurality of threads generated by the mobile monitor are associated with at least one of: data decryption or session association.

14. The method in claim 8, further comprising:
generating the encrypted data to be embedded in the second request message and embedding the encrypted data, via the at least one mobile device, in the second request message before transmitting the second request to the stateful virtual machine.

15. The method in claim 8, further comprising:
updating, via the stateful virtual machine, a central database upon the processing of the second request message.

* * * * *